May 10, 1966  W. W. TRENOUTH  3,250,108
HAND TOOL FOR FORMING AUTOMOTIVE MOLDING CLIPS
Filed Feb. 18, 1963  3 Sheets-Sheet 1

INVENTOR.
WILLIAM W. TRENOUTH
BY
*Sanford Schnurmacher*
ATTORNEY.

May 10, 1966 W. W. TRENOUTH 3,250,108
HAND TOOL FOR FORMING AUTOMOTIVE MOLDING CLIPS
Filed Feb. 18, 1963 3 Sheets-Sheet 2
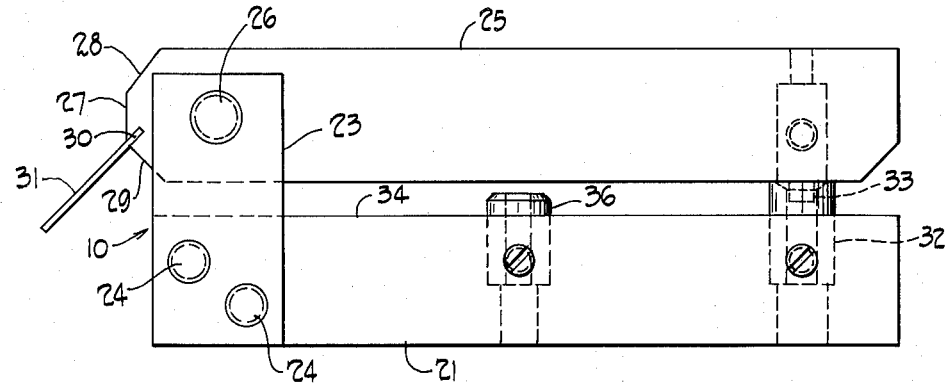
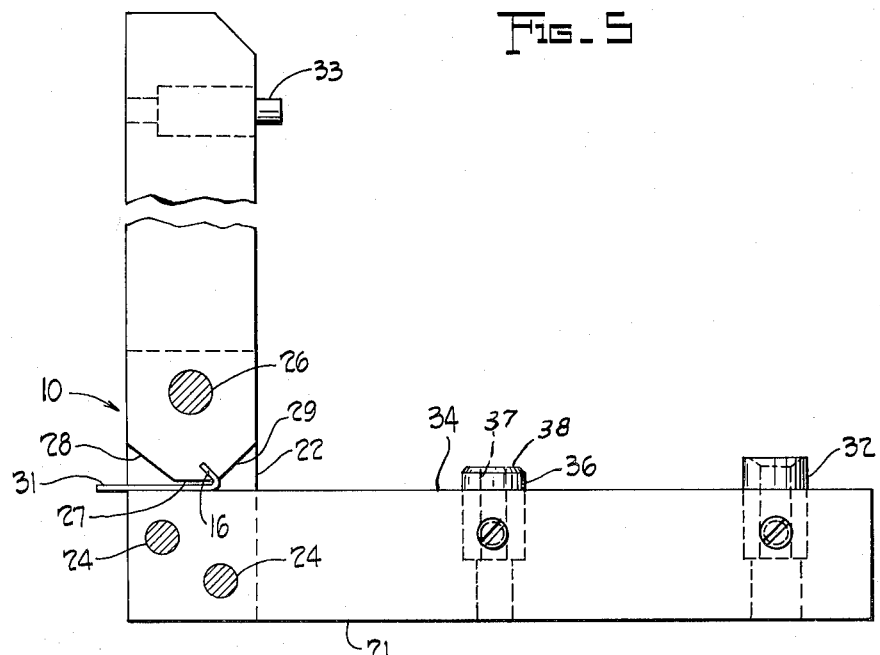
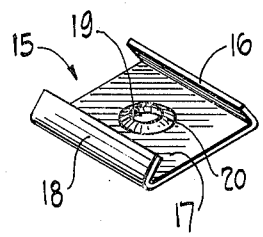
INVENTOR.
WILLIAM W. TRENOUTH
BY Sanford Schnurmacher
ATTORNEY.

May 10, 1966     W. W. TRENOUTH     3,250,108

HAND TOOL FOR FORMING AUTOMOTIVE MOLDING CLIPS

Filed Feb. 18, 1963     3 Sheets-Sheet 3

INVENTOR.
WILLIAM W. TRENOUTH
BY
ATTORNEY.

United States Patent Office 3,250,108
Patented May 10, 1966

3,250,108
HAND TOOL FOR FORMING AUTOMOTIVE MOLDING CLIPS
William W. Trenouth, Watford, Ontario, Canada
Filed Feb. 18, 1963, Ser. No. 259,235
1 Claim. (Cl. 72—310)

This invention relates to a new and improved tool for bending and shaping sheet metal, and particularly to a hand tool for forming mounting clips and "T" bolts for automotive molding strips.

Conducive to a better understanding of the invention, it may be well to point out that the decorative trim and molding used to finish off automobile bodies is usually attached thereto by means of resilient sheet metal clips which are directly mounted on the front face of the body panels by means of self threading metal screws, and to which the trim is secured through pressed or expansion fits, so that none of the mounting means is visible after the trim is in place.

In locations where it is possible to reach the back side of the body panel, so-called "T" bolts are used to anchor the molding in place. Conventional "T" bolts comprise a flat piece of sheet metal of a size to fit between the molding flanges and having a bolt welded, brazed or soldered thereto and extended through a hole in the body panel and locked in place by a nut, drawn up against the back side thereof.

Since each car manufacturer seeks to provide distinctive trim of varied width and configuration for its product, the width and length of mounting clips and "T" bolts differ from car to car.

As a result the body repair shop is required to have a sizable inventory of such slips and "T" bolts in stock, and even so, a particular size may not be at hand when needed, which delays completion of the job and entails time and effort to procure the necessary unit.

The primary object of the invention, therefore is to provide a hand tool for conveniently and easily forming molding clips from sheet metal strips.

A further object is to provide a hand tool of the type stated, that is simple in operation, relatively inexpensive to manufacture, and of long life.

These, and other objects of the invention will become apparent from a reading of the following specification and claims, together with the accompanying drawings, wherein like parts are referred to and indicated by like reference numerals, and wherein:

FIGURE 5 is a front view of the tool showing a flat sheet metal clip blank engaged by the arm, with the arm in a first position, parallel to the base bed;

FIGURE 6 is a front view of the tool illustrated in FIGURE 5, showing the arm in a second position, at 90° to the base bed, with one of the clip flanges formed on the held blank;

FIGURE 8 is a perspective view of a finished clip;

Figure 1:
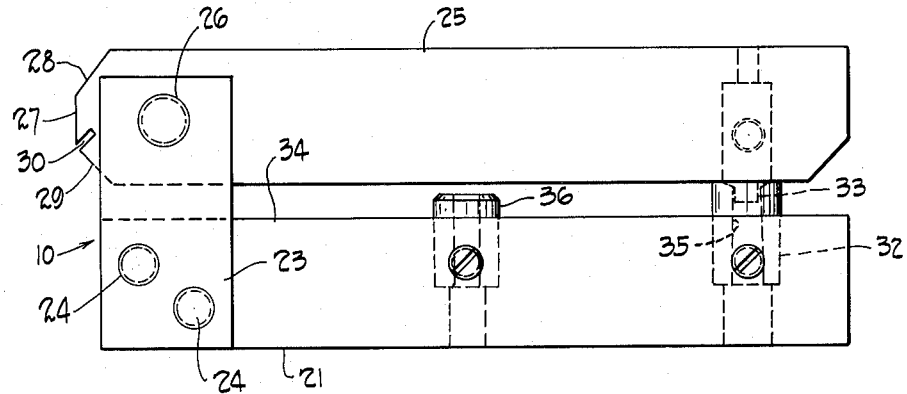
FIGURE 1 is a front elevation of the Hand Tool for Forming Sheet Metal Molding Clips, that is the subject of this invention, showing its arm in a first position, parallel to the base bed.

Referring more particularly to the drawing, there is seen in FIGURE 1 the hand tool, that is the subject of this invention, broadly indicated by reference numeral 10.

The device comprises an elongated solid steel base 21 of substantially square cross-section, having a flat bed portion 34 at its forward end, an upstanding die block 32 positioned at its rear end with a die hole 35 centered therein having a tapered conical counter-bore at its upper end, which serves as a table for supporting the fully shaped clip, for a purpose to be hereinafter disclosed.

Reference numerals 22 and 23 indicate two upstanding brackets mounted on the base on either side of the bed 34, by means of rivets 24.

An elongated solid steel arm 25, of square cross-section, similar to that of the base 21, is pivotally mounted on the base brackets 22 and 23 by means of a pivot pin 26.

Reference numeral 27 indicates a flat anvil face located at the forward end of the arm 25, in a plane perpendicular to the long axis of the arm.

The forward end of the arm 25 is tapered, as at 28 and 29, above and below the anvil 27, to provide clearance between the arm 25 and base bed 34 when the arm is swung upward on the pivot pin 26.

Figure 2:
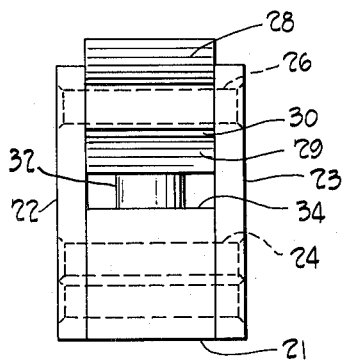
FIGURE 2 is a left end view of the same.
Figure 3:
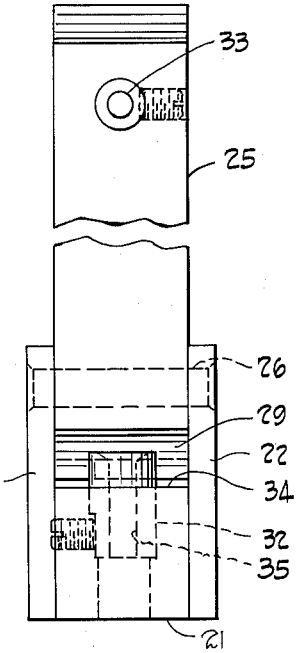
FIGURE 3 is a right end view of the tool with its forming arm in a second position, at 90° to the base bed.
Figure 4:
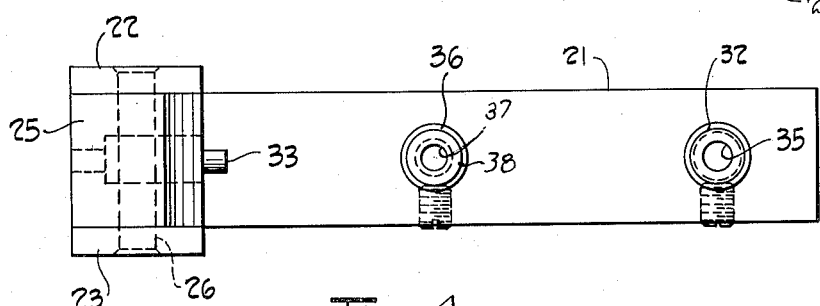
FIGURE 4 is a top plan view of the tool illustrated in FIGURE 3.

A slot 30 is cut in the face of the anvil 27 at an angle of 45° thereto, and extends the width thereof, as seen in FIGURES 1 and 2.

A punch 33 is positioned at the rear end of the arm 25 in alignment with the die block bore 35, as seen in FIGURES 1 and 5.

The molding clip 15, which the tool 10 is used to form, is seen in FIGURE 8.

Figure 9:
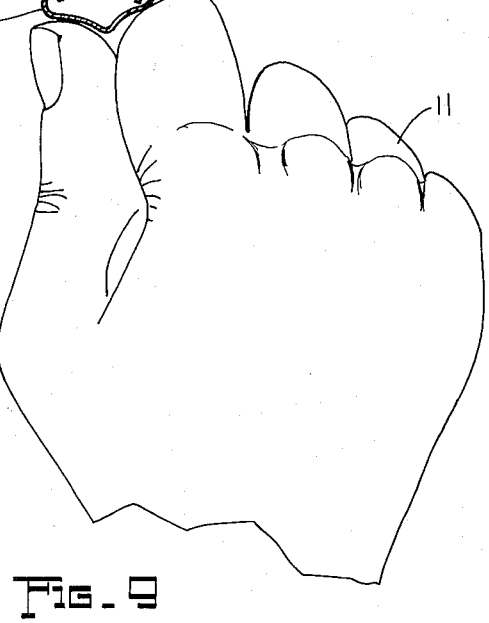
FIGURE 9 is a perspective view, partly in section, showing a molding strip being applied to a clip mounted on an automobile body.
Figure 10:
FIGURE 10 is a sectional view through the clip and molding showing the molding fully engaged by the clip and mounted on the automobile body.

The clip 15 is made of sheet metal and has a flat body portion 17 bounded at its ends by two flanges 16 and 18, inturned toward the center of the body portion 17 at an angle of 45°. A mounting hole 19, bounded by a tapered collar 20, is centered in the body 17. The clip 15 is mounted on the outer face of a sheet metal body panel 14, as seen in FIGURES 9 and 10, by means of a self-threading metal screw 13. A decorative molding strip 12 is attached to the clip 15 by engaging one edge of the molding with one of the clip flanges by grasping it between the fingers of a hand 11, as seen in FIGURE 9, and then forcing the opposite edge of the molding strip over the second flange of the clip 15, to conceal the clip within the molding, which is securely anchored in place by the interaction between the resilient clip flanges and the molding edges, as seen in FIGURE 10.

The clip 15 is formed by cutting a strip of sheet metal to form a flat blank of suitable length and width. The length being determined by the width of the molding strip with which the clip is to be used.

One end of the flat blank 31 is then inserted into the anvil slot 30 of the arm 25, with the arm 25 in its first position, parallel to the base bed 34, as seen in FIGURE 5. The arm 25 is then swung upward on pivot pin 26 to its second position, as seen in FIGURE 6, wherein the arm 25 is at 90° to the base bed 34, with the anvil face 27 parallel thereto. This movement of the arm carries the blank 31 to a position between the bed 34 and the anvil 27, with the blank 31 pressed thereagainst, and with the held end of the blank turned back upon itself to form the first flange 16 of the clip 15.

The arm 25 is then returned to its first position, and the semi-formed blank removed from the slot 30. The blank 31 is then turned around and its other end is inserted into the anvil slot 30, and the arm 25 again swung to its second position, which causes the formation of a second inturned flange 18, as seen in FIGURE 8.

Figure 7:
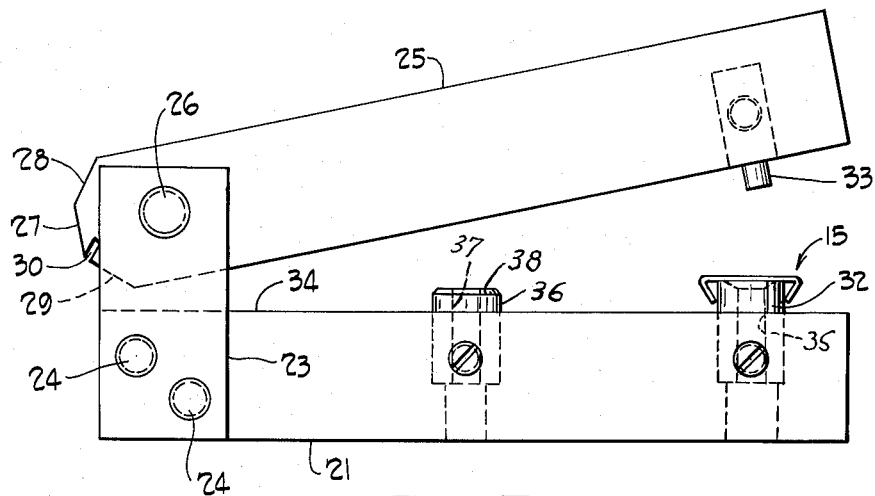
FIGURE 7 is a front view of the tool, showing a formed clip positioned on the die table preparatory to having a mounting hole punched therethrough.

The clip 15, now with both inturned flanges 16 and 18 formed, is placed on the die block 32 with the body portion 17 thereof positioned over the die hole 35 and with the flanges 16 and 18 in a dependent position, as seen in FIGURE 7. The arm 25 is then moved to its first position, wherein the punch 33 rests upon the top of the clip body 17. The arm 25 is then struck with a hammer, at the punch 33, causing the punch to be driven through the clip body 17 and into the die hole 35 of the table 32, to form the clip anchoring hole 19 and its bounding collar 20.

The completed clip is ready to be attached to the car body panel, as described above. It will be evident that clips 15 of any required size may be easily and accurately made by the use of my tool. The length of the base 21 and arm 25 is such that the arm will provide adequate leverage for formation of the flanges, dependent upon the gage and hardness of the metal used.

While the angular inclination of the slot 30 is illustrated as being 45°, it is to be understood that other angular settings may be used, if required, for the proper fit with molding strips of other internal configuration than that shown.

It will now be clear that there is provided a device which accomplishes the objectives heretofore set forth.

While the invention has been disclosed in its preferred form, it is to be understood that the specific embodiment thereof, as described and illustrated herein, is not to be considered in a limited sense, as there may be other forms or modifications of the invention which should also be construed to come within the scope of the appended claim.

I claim:

A hand tool for forming sheet metal mounting clips for automobile body moldings, comprising in combination, a base member having a bed portion, at one end thereof; a pair of transversely spaced upstanding brackets mounted on the base at opposite sides of the bed portion; an elongated arm pivotally mounted, proximate one end thereof, between the brackets; the arm having a flat anvil face, located ahead of the pivot point, extending crosswise of its long axis at 90° thereto, and bounded along its lower and upper edges by flats tapered toward the pivot point; the arm also having a slot extending inwardly of the lower edge of the anvil face at an acute angle thereto; the arm being swingable, in an arc, relative to the bed between, a first position, parallel to the bed, with the anvil face perpendicular thereto, and, a second position, at 90° to the bed, in which position the anvil face is parallel to the bed and spaced therefrom a distance equal to the thickness of the sheet metal strip used to from the clip; the anvil slot being adapted to receive the end of a sheet metal strip therein, when the arm is in its first position; the arm acting to carry the so-engaged strip end downward across the bed and against the anvil face, when swung upward to its second position, to bend the so-engaged strip end back upon the strip to form a flange inturned at an acute angle thereto.

References Cited by the Examiner

UNITED STATES PATENTS

| | | |
|---|---|---|
| 1,560,745 | 11/1925 | Walker. |
| 2,013,574 | 9/1935 | Miller. |
| 2,035,187 | 3/1936 | Olson. |
| 2,053,309 | 9/1936 | Yeager _____ 153—2 |
| 2,268,628 | 1/1942 | Siuszko. |
| 2,709,286 | 5/1955 | Bedford _____ 24—73 |
| 2,732,744 | 1/1956 | Kuchman et al. |
| 3,011,234 | 12/1961 | Fiddler _____ 24—73 |
| 3,088,346 | 5/1963 | Francia. |

WILLIAM FELDMAN, *Primary Examiner.*

MILTON S. MEHR, JAMES L. JONES, JR., *Examiners.*

R. V. PARKER, JR., *Assistant Examiner.*